United States Patent
Kim et al.

(10) Patent No.: US 12,130,808 B2
(45) Date of Patent: Oct. 29, 2024

(54) DEVICE AND METHOD FOR CONVERTING NATURAL LANGUAGE QUERY INTO SQL QUERY

(71) Applicant: 42Maru Inc., Seoul (KR)

(72) Inventors: Dong Hwan Kim, Seoul (KR); Han Soo Kim, Bucheon-si (KR); Ah Rim Sohn, Seoul (KR); Jun Hyeok Park, Seoul (KR); In Je Seong, Seoul (KR); Sun Young Lee, Seoul (KR)

(73) Assignee: 42Maru Inc., Seoul (KR)

( * ) Notice: Subject to any disclaimer, the term of this patent is extended or adjusted under 35 U.S.C. 154(b) by 331 days.

(21) Appl. No.: 17/539,502

(22) Filed: Dec. 1, 2021

(65) Prior Publication Data
US 2023/0169074 A1   Jun. 1, 2023

(30) Foreign Application Priority Data
Nov. 29, 2021  (KR) .................. 10-2021-0166794

(51) Int. Cl.
*G06F 16/2452*   (2019.01)
*G06F 16/242*    (2019.01)
*G06F 40/247*    (2020.01)

(52) U.S. Cl.
CPC .... *G06F 16/24522* (2019.01); *G06F 16/2433* (2019.01); *G06F 40/247* (2020.01)

(58) Field of Classification Search
CPC ......... G06F 16/245222; G06F 16/2433; G06F 40/247
See application file for complete search history.

(56) References Cited

U.S. PATENT DOCUMENTS

| 9,665,662 B1* | 5/2017 | Gautam ............... G06F 16/3328 |
| 2021/0303555 A1* | 9/2021 | Kim .................. G06F 16/90332 |
| 2022/0067037 A1* | 3/2022 | Ranganathan .......... G10L 15/22 |

FOREIGN PATENT DOCUMENTS

CN       111221947 B  * 11/2023  ......... G06F 16/3329

OTHER PUBLICATIONS

Office Action issued Nov. 20, 2023 in Korean Application No. 10-2021-0166794.
Victor Zhong, et al., "SEQ2SQL: Generating Structured Queries From Natural Language Using Reinforcement Learning", arXiv:1709.00103v7 [cs.CL], Nov. 9, 2017, pp. 1-12 (12 pages total).
Hongchi Shi, et al., "Using Natural Language to Access Databases on the Web", IEEE, 2001, pp. 429-434 (6 pages total).

(Continued)

*Primary Examiner* — Mohammad K Islam
(74) *Attorney, Agent, or Firm* — Sughrue Mion, PLLC

(57) ABSTRACT

Provided are a device and method for converting a natural language query into a structured query language (SQL) query for a database search. The method includes an operation A of labeling natural language queries included in training data, an operation B of converting the natural language queries into second SQL queries by applying the natural language queries to an SQL conversion model, an operation C of verifying the second SQL queries, and an operation D of training the SQL conversion model by comparing the second SQL queries with third SQL queries corresponding to the natural language queries of the training data.

12 Claims, 2 Drawing Sheets

(56) References Cited

OTHER PUBLICATIONS

Rick Dobson, "Beginning SQL Server 2005 Express Database Applications with Visual Basic Express and Visual Web Developer Express From Novice to Professional", Apress Berkeley, 2006 (604 pages total).
Yujian Gan, et al., "Towards Robustness of Text-to-SQL Models against Synonym Substitution", arXiv:2106.01065v2 [cs.CL], Jun. 19, 2021 (11 pages total).

* cited by examiner

DEVICE AND METHOD FOR CONVERTING NATURAL LANGUAGE QUERY INTO SQL QUERY

CROSS-REFERENCE TO RELATED APPLICATION

This application claims priority to and the benefit of Korean Patent Application No. 10-2021-0166794, filed on Nov. 29, 2021, the disclosure of which is incorporated herein by reference in its entirety.

BACKGROUND

1. Field of the Invention

The present invention relates to a device and method for converting a natural language query into a structured query language (SQL) query, and more particularly, to a device and method for increasing accuracy through preprocessing and postprocessing of a natural language to SQL (NL2SQL) model which generates an SQL query from a natural language query.

2. Discussion of Related Art

A natural language to structured query language (NL2SQL) technology for converting a natural language query into a query of an SQL which is a language for managing a relational database has appeared lately. The NL2SQL enables a user without database-related expert knowledge to conveniently search for information in a database. However, NL2SQL has appeared lately, and due to the high level of technical difficulty, accuracy is not high enough to be applied to actual services. Also, since expert knowledge and time are required to build training data for learning the NL2SQL technology, building training data is difficult and costs are high.

SUMMARY OF THE INVENTION

The present invention is directed to converting a natural language query into a structured query language (SQL) query for a database search.

The present invention is directed to increasing accuracy in the process of converting a natural language query into an SQL query by preprocessing and postprocessing training data.

According to an aspect of the present invention, there is provided a method of converting a natural language query into an SQL query, the method including an operation A of labeling natural language queries included in training data, an operation B of converting the natural language queries into second SQL queries by applying the natural language queries to an SQL conversion model, an operation C of verifying the second SQL queries, and an operation D of training the SQL conversion model by comparing the second SQL queries with third SQL queries corresponding to the natural language queries of the training data.

According to another aspect of the present invention, there is provided a device for converting a natural language query into an SQL query, the device including a training data manager configured to label each of natural language queries included in training data, an SQL converter configured to generate an SQL conversion model for generating second SQL queries on the basis of the natural language queries, a database schema, and labeled tags of the training data, an SQL verifier configured to verify the second SQL queries, and an SQL conversion model trainer configured to train the SQL conversion model by comparing the second SQL queries with third SQL queries corresponding to user queries of the training data.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
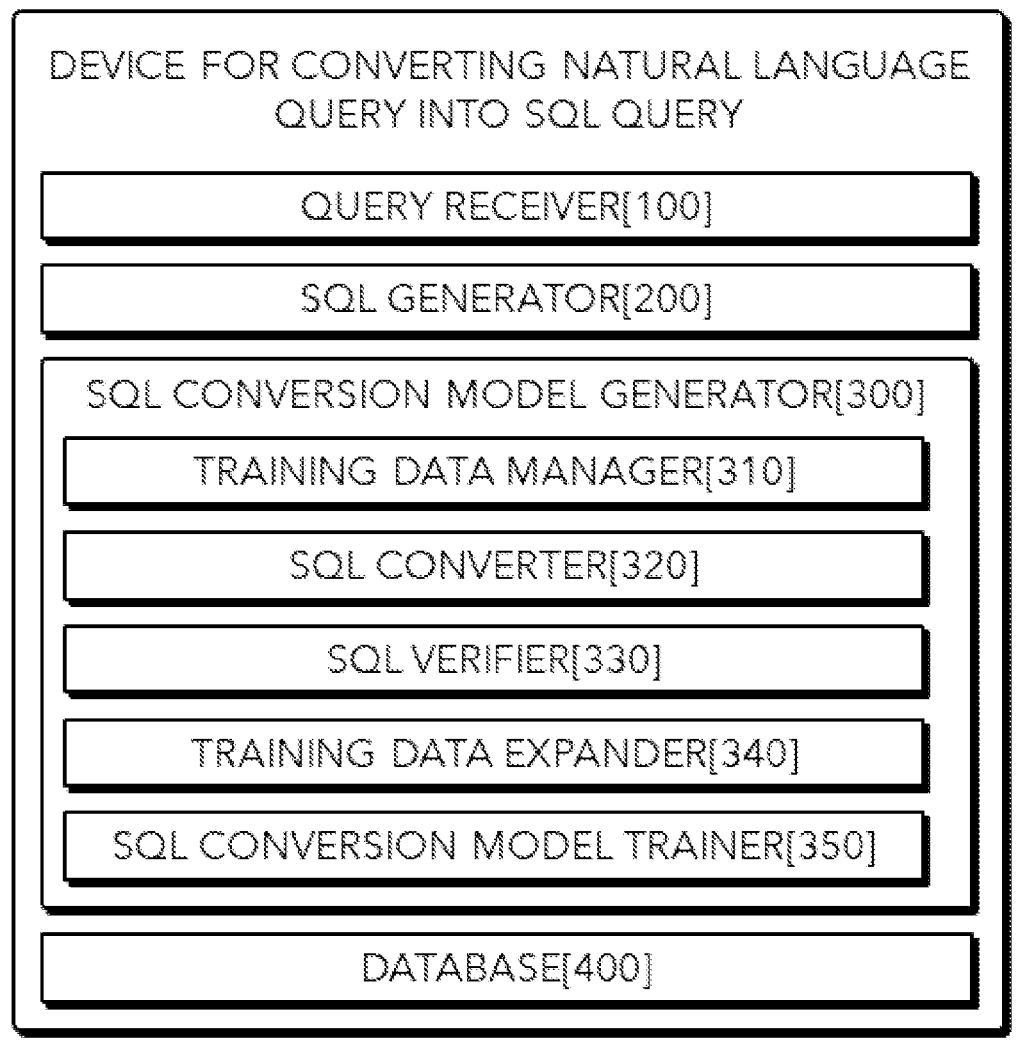
FIG. 1 is a block diagram illustrating a schematic configuration of a device for converting a natural language query into a structured query language (SQL) query according to an exemplary embodiment of the present invention.

The above-described objects, features, and advantages will be described in detail with reference to the accompanying drawings such that those of ordinary skill in the art may readily implement the technical spirit of the present invention. In describing the present invention, when it is determined that the detailed description of a known technology related to the present invention may unnecessarily obscure the subject matter of the present invention, the detailed description will be omitted.

Throughout the drawings, like reference numerals refer to like elements, and all combinations described in the specification and claims may be combined in any manner. It is to be understood that unless otherwise defined, singular referents may include one or more referents and singular expression may include plural expressions.

The terminology used herein is for the purpose of describing specific exemplary embodiments and is not intended to be limiting. As used herein, the singular forms are intended to include the plural forms as well unless the context clearly indicates otherwise. The term "and/or" includes any and all combinations of listed elements. The terms "comprises," "comprising," "includes," "including," "has," "having," etc. have inclusive meanings. Accordingly, the terms specify stated features, integers, steps, operations, elements, and/or components and do not preclude the presence or addition of features, integers, steps, operations, elements, components and/or groups thereof. Steps, processes, and operations of a method described herein should not be construed as being performed necessarily in such a particular order as discussed or illustrated unless the order is specifically defined. It should be understood that additional or alternative steps may be used.

Each of the elements may be implemented as a hardware processor. The elements may be integrated into one hardware processor or combined into a plurality of hardware processors.

Hereinafter, exemplary embodiments of the present invention will be described in detail with reference to the accompanying drawings.

FIG. 1 is a block diagram illustrating a schematic configuration of a device for converting a natural language query into a structured query language (SQL) (hereinafter "SQL conversion device") according to an exemplary embodiment of the present invention. Referring to FIG. 1, the SQL conversion device may include a query receiver 100, an SQL generator 200, an SQL conversion model generator 300, and a database 400.

The query receiver 100 may receive a first natural language query from a user. The query receiver 100 may receive the first natural language query for which the user wants to search a database through a user terminal such as a smart terminal or a personal computer (PC).

The SQL generator 200 may generate a first SQL query on the basis of the first natural language query received from the user. The SQL generator 200 may generate the first SQL query based on the first natural language query through an SQL conversion model which is a natural language to structured query language (NL2SQL) model for converting a natural language query into an SQL query. The used first natural language query and the first SQL may be further used as training data for training the SQL conversion model.

The SQL conversion model generator 300 may generate the SQL conversion model that allows the SQL generator 200 to convert a natural language query into an SQL query. The SQL conversion model generator 300 may include a training data manager 310, an SQL converter 320, an SQL verifier 330, and a training data expander 340.

The training data manager 310 is for managing training data for training the SQL conversion model and may label each of second natural language queries included in the training data. The training data may include a second user query, a database schema, and a third SQL corresponding to the second user query and further include a tag labeled as follows.

Specifically, the training data manager 310 may extract a plurality of keywords included in the second natural language queries and label each of the keywords with a corresponding tag. Tags used in the exemplary embodiment of the present invention include at least one of 0, SA, SC-NUM/TEXT, WO, WV, and WC-NUM/TEXT tags. The 0 tag means a meaningless keyword in an SQL conversion, the SA tag means a keyword corresponding to a SELECT statement function of the SQL, the SC-NUM/TEXT tag means a keyword corresponding to a SELECT statement table column and type of the SQL, the WO tag means a keyword corresponding to a WHERE statement operator of the SQL, the WV tag means a keyword corresponding to WHERE statement data of the SQL, and the WC-NUM/TEXT tag means a keyword corresponding to a WHERE statement table column and type of the SQL.

The SC-NUM/TEXT tag and the WC-NUM/TEXT tag may be used as an SC-NUM, SC-TEXT, WC-NUM, or WC-TEXT tag depending on the type of table column.

For example, when training data includes the second user query "What was the average game when the attendance was higher than 600?", the training data manager 310 may label "What," "was," "the," "when," "the," and "was" with the 0 tag, "average" with the SA tag, "game" with the SC-NUM tag, "attendance" with the WC-NUM tag, "higher" and "than" with the WO tag, and "600" with the WV tag.

The training data manager 310 may perform the process of labeling the second natural language queries with tags on the basis of SQL grammar. The training data manager 310 may use an additional algorithm for tag labeling on the basis of the SQL grammar, and in this case, the used algorithm may employ an existing method.

Since the training data manager 310 may further give a weight to each keyword of a natural language query by labeling the natural language query with tags, the SQL conversion model can be trained more efficiently.

The SQL converter 320 may generate the SQL conversion model for generating a second SQL on the basis of the second natural language queries, the database schema, and labeled tags of the training data. The SQL converter 320 may convert the second natural language queries of the training data into second SQL queries on the basis of the SQL conversion model.

While the existing NL2SQL model generates an SQL on the basis of a natural language query and a database schema, the SQL conversion model according to the exemplary embodiment of the present invention may convert a natural language query into an SQL query on the basis of tags labeled by the training data manager 310 as well as a natural language query and a database schema. In other words, the SQL converter 320 of the present invention uses more tags to generate an SQL such that the SQL conversion model can be trained with each piece of training data accurately and rapidly.

As a case in point, a labeled tag defines which one of a SELECT statement function SA, a table column SC-NUM/TEXT, a WHERE statement operator WO, WHERE statement data WV, and a table column WC-NUM/TEXT a keyword included in the natural language query is. Accordingly, a labeled tag makes it possible to determine whether each keyword is meaningful for generating an SQL and thereby allows the SQL converter 320 to be trained accurately and rapidly.

The SQL verifier 330 may verify the second SQL queries generated by the SQL converter 320. Searching a database for a grammatically incorrect SQL query causes unnecessary load, and even when the database is searched for the grammatically incorrect SQL query, an error occurs. Accordingly, the speed in acquiring a response to a query of a user from a database may be low. Consequently, the SQL conversion device can verify whether the grammar of the generated second SQL queries is correct through the SQL verifier 330.

The SQL verifier 330 may verify whether SELECT statement functions of the second SQL queries and types of table columns correspond to each other. When a SELECT statement function is AVG and the type of table column of the SELECT statement is NUMERIC, the SQL verifier 330 may determine that the grammar of the second SQL query is correct. Otherwise, the SQL verifier 330 may determine that the grammar of the second SQL query is incorrect.

When the grammar of the second SQL query is determined to be incorrect, the SQL verifier 330 may set a response to the second SQL query to NO ANSWER. Since the SQL verifier 330 only provides a fixed response (NO ANSWER) so that a grammatically incorrect SQL query is not used for a database search, it is possible to increase a response speed to a database search for a natural language query.

The training data expander 340 may expand the training data by substituting the second natural language queries and the table columns of the second SQL queries with synonyms. The training data expander 340 may substitute the second natural language queries and the table columns of the second SQL queries with synonyms using a synonym dictionary, which is built in advance to acquire synonyms, and/or synonyms learned through word embedding.

Since every user poses a query through his or her own expression, the training data expander 340 may increase the number of pieces of training data by continuously learning identical or similar word expressions.

The training data expander 340 may store the expanded training data in the database 400.

An SQL conversion model trainer 350 may train the SQL conversion model by comparing the second SQL queries with third SQL queries corresponding to the second user query.

The SQL conversion model trainer 350 may calculate loss values by comparing the second SQL queries with the third SQL queries of the training data. The SQL conversion model trainer 350 may follow an existing method in calculating the loss values.

The database 400 may store training data for training of the SQL conversion model trainer 350 and the basic data for the SQL generator 200 to convert the user query received by the query receiver 100 into an SQL query.

Figure 2:
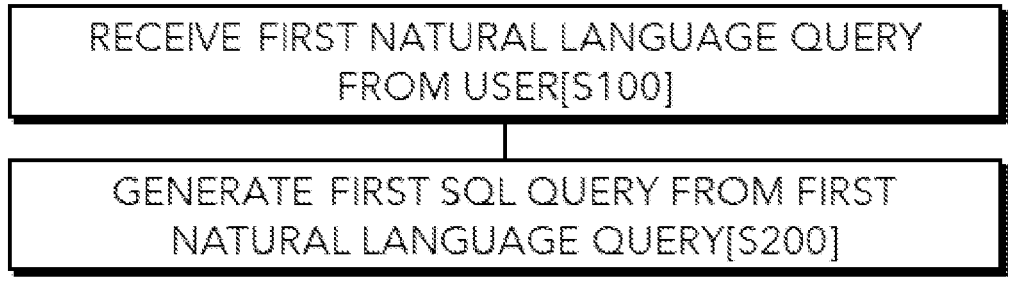
FIG. 2 is a flowchart for performing a method of converting a natural language query into an SQL query according to an exemplary embodiment of the present invention.

FIG. 2 is a flowchart for performing a method of converting a natural language query into an SQL query according to an exemplary embodiment of the present invention. The method of converting a natural language query into an SQL query will be described below with reference to FIG. 2. In describing the method of converting a natural language query into an SQL query, the same details as those of the above-described device for converting a natural language query into an SQL query may be omitted.

In operation 100, the SQL conversion device may receive a first natural language query from a user. The SQL conversion device may receive the first natural language query for which the user wants to search a database through a user terminal such as a smart terminal or a PC.

In operation 200, the SQL conversion device may generate a first SQL query on the basis of the first natural language query received from the user. The SQL conversion device may be based on an SQL conversion model which generates an SQL query from a natural language query.

A method of training an SQL conversion model used in operation 200 will be described in detail below with reference to FIG. 3.

Figure 3:
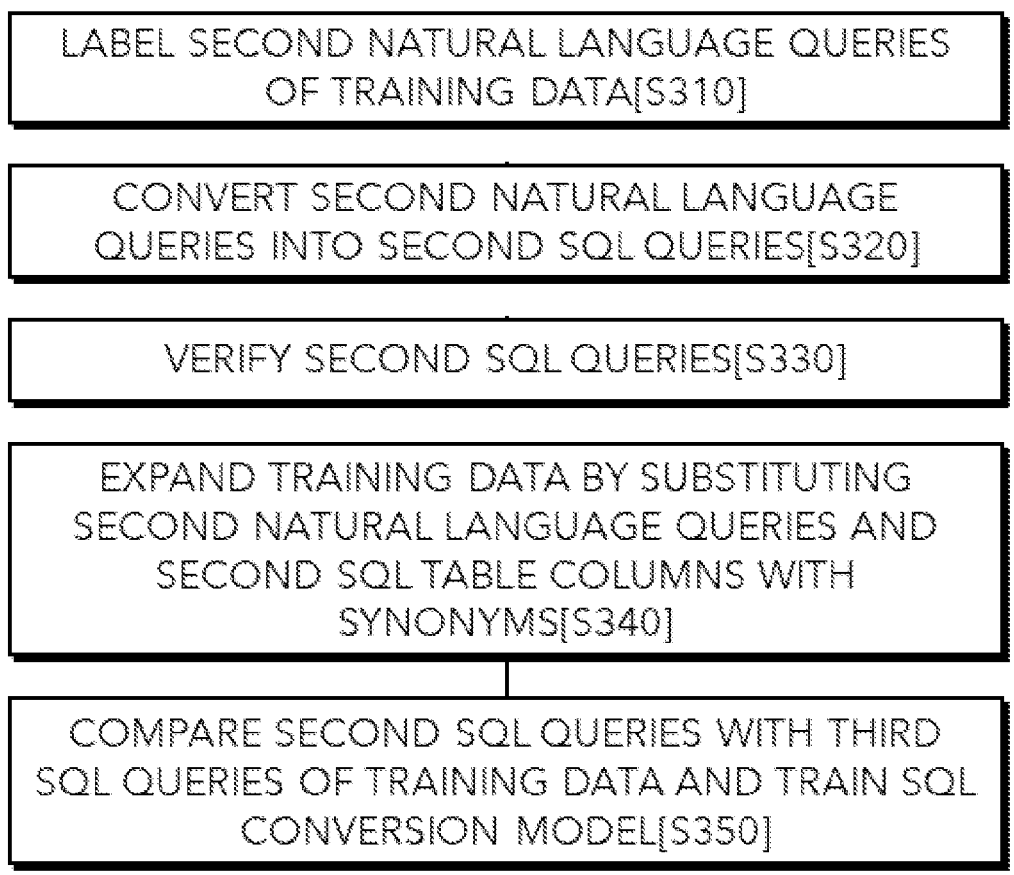
FIG. 3 is a flowchart for generating an SQL conversion model which converts a natural language query into an SQL query according to an exemplary embodiment of the present invention.

Referring to FIG. 3, in operation 310, the SQL conversion device may label second natural language queries included in training data. The SQL conversion device may extract a plurality of keywords included in the second natural language queries and label each of the keywords with a corresponding tag. In the process of labeling the second natural language queries with tags, the SQL conversion device may use an algorithm based on SQL grammar. Tags used in the exemplary embodiment of the present invention include at least one of O, SA, SC-NUM/TEXT, WO, WV, and WC-NUM/TEXT tags.

In operation 320, the SQL conversion device may convert the second natural language queries into second SQL queries on the basis of the second natural language queries, a database schema, and the labeled tags of the training data.

In operation 330, the SQL conversion device may verify the second SQL queries generated in operation 320. The SQL conversion device may verify whether SELECT statement functions of the second SQL queries and types of table columns correspond to each other. When the SELECT statement functions are AVG and the types of table columns of the SELECT statements are NUMERIC, the SQL conversion device may determine that the grammar of the second SQL queries is correct. Otherwise, the SQL conversion device may determine that the grammar of the second SQL queries is incorrect. When the grammar of the second SQL queries is determined to be incorrect, the SQL conversion device may set a response to the second SQL queries to NO ANSWER.

In operation 340, the SQL conversion device may expand the training data by substituting the second natural language queries and the table column of the second SQL queries with synonyms. The SQL conversion device may substitute the second natural language queries and the table column of the second SQL queries with synonyms using a synonym dictionary, which is built in advance to acquire synonyms, and/or synonyms learned through word embedding.

In step 350, the SQL conversion device may train the SQL conversion model by comparing the second SQL queries generated on the basis of the training data with third SQL queries included in the training data. The SQL conversion device may calculate loss values between the second SQL queries and the third SQL queries to train the SQL conversion model.

According to the above-described present invention, a natural language query can be converted into an SQL query, and it is possible to increase accuracy in the process of converting a natural language query into an SQL query by preprocessing and postprocessing training data.

The exemplary embodiments of the present invention disclosed in the specification and drawings are only illustrative of the present invention to easily describe the technical content of the present invention and facilitate understanding of the present invention and are not intended to limit the scope of the present invention. It will be apparent to those of ordinary skill in the art that other modifications based on the technical spirit of the present invention are possible in addition to the embodiments disclosed herein.

What is claimed is:

1. A method of converting a natural language query into a structured query language (SQL) query, the method being performed by a device for converting the natural language query into the SQL query in which the device comprises an SQL conversion model generator for generating an SQL conversion model, and the SQL conversion model generator includes a training data manager, an SQL converter, an SQL verifier and an SQL conversion model trainer, the method comprising:

an operation A of labeling, by the training data manager, natural language queries included in training data, wherein the operation A comprises extracting a plurality of keywords included in the natural language queries and labeling the plurality of extracted keywords with a plurality of tags based on SQL grammar;

an operation B of converting, by the SQL converter, the natural language queries into second SQL queries by applying the natural language queries to the SQL conversion model, wherein the operation B comprises generating the SQL conversion model for generating the second SQL queries on the basis of the natural language queries, a database schema, and labeled tags of the training data, and converting the natural language queries of the training data into the second SQL queries on the basis of the SQL conversion model;

an operation C of verifying, by the SQL verifier, the second SQL queries; and an operation D of comparing, by a SQL conversion model trainer, the second SQL queries with third SQL queries corresponding to the natural language queries of the training data to train the SQL conversion model.

2. The method of claim 1, wherein the plurality of tags include at least one of 0 tag, SA tag, SC-NUM tag and SC-TEXT tag, WO tag, WV tag, WC-NUM tag and WC-TEXT tag,
- wherein the o tag means a meaningless keyword in an SQL conversion,
- the SA tag means a keyword corresponding to a SELECT statement function,
- the SC-NUM tag and the SC-TEXT tag mean keywords corresponding to a SELECT statement table column and type,
- the WO tag means a keyword corresponding to a WHERE statement operator,
- the WV tag means a keyword corresponding to a WHERE statement data, and
- the WC-NUM tag and WC-TEXT tag mean keywords corresponding to a WHERE statement table column and type.

3. The method of claim 1, wherein the operation C comprises:
- verifying whether SELECT statement functions of the second SQL queries and types of table columns correspond to each other; and
- when the verifying of the second SQL queries fails, setting a response to the second SQL queries to NO ANSWER.

4. The method of claim 1, further comprising substituting the natural language queries and table columns of the second SQL queries with synonyms to expand the training data.

5. The method of claim 1, wherein the operation D comprises calculating loss values between the second SQL queries and the third SQL queries to train the SQL conversion model.

6. The method of claim 1, further comprising:
- receiving a natural language query from a user; and
- generating a first SQL query from the natural language query on the basis of the SQL conversion model trained through the operations A to D.

7. A device for converting a natural language query into a structured query language (SQL) query, the device comprising:
- a memory storing instructions; and
- a processor configured to execute the instructions to:
  - label each of natural language queries included in training data, wherein the labeling comprises extracting a plurality of keywords included in the natural language queries, and labeling the plurality of extracted keywords with a plurality of tags based on SQL grammar;
  - generate an SQL conversion model for generating second SQL queries on the basis of the natural language queries, a database schema, and labeled tags of the training data;
  - convert the natural language queries into second SQL queries by applying the natural language queries to the SQL conversion model;
  - verify the second SQL queries, and
  - compare the second SQL queries with third SQL queries corresponding to user queries of the training data and train the SQL conversion model.

8. The device of claim 7, wherein the processor is further configured to:
- receive a natural language query from a user; and
- generate first SQL queries from the natural language queries.

9. The device of claim 7, wherein the plurality of tags include at least one of 0 tag, SA tag, SC-NUM tag and SC-TEXT tag, WO tag, WV tag, WC-NUM tag and WC-TEXT tag, and
- wherein the o tag means a meaningless keyword in an SQL conversion,
- the SA tag means a keyword corresponding to a SELECT statement function,
- the SC-NUM tag and the SC-TEXT tag mean keywords corresponding to a SELECT statement table column and type,
- the WO tag means a keyword corresponding to a WHERE statement operator,
- the WV tag means a keyword corresponding to a WHERE statement data, and
- the WC-NUM tag and WC-TEXT tag mean keywords corresponding to a WHERE statement table column and type.

10. The device of claim 7, wherein the processor is further configured to:
- verify whether SELECT statement functions of the second SQL queries and types of table columns correspond to each other; and
- when the verifying of the second SQL queries fails, set a response to the second SQL queries to NO ANSWER.

11. The method of claim 1, further comprising giving weights to the plurality of extracted keywords of the natural language queries based on the labeling of the plurality of keywords.

12. The device of claim 7, wherein the processor is further configured to give weights to the plurality of extracted keywords of the natural language queries based on the labeling of the plurality of keywords.

* * * * *